US010212349B2

(12) United States Patent
Kuchiki

(10) Patent No.: US 10,212,349 B2
(45) Date of Patent: Feb. 19, 2019

(54) IMAGING APPARATUS AND CONTROL METHOD

(71) Applicant: CANON KABUSHIKI KAISHA, Tokyo (JP)

(72) Inventor: Hiroaki Kuchiki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/801,510

(22) Filed: Nov. 2, 2017

(65) Prior Publication Data
US 2018/0146142 A1 May 24, 2018

(30) Foreign Application Priority Data
Nov. 14, 2016 (JP) .................................. 2016-221337

(51) Int. Cl.
H04N 5/232 (2006.01)
H04N 5/225 (2006.01)

(52) U.S. Cl.
CPC ..... H04N 5/23287 (2013.01); H04N 5/23258 (2013.01); H04N 5/23261 (2013.01)

(58) Field of Classification Search
CPC ........... H04N 5/23287; H04N 5/23258; H04N 5/23261; H04N 5/2254; H04N 5/04
See application file for complete search history.

(56) References Cited

U.S. PATENT DOCUMENTS

| 8,786,743 | B2 * | 7/2014 | Asukabe | H04N 5/23258 348/296 |
| 2007/0019937 | A1 * | 1/2007 | Endo | G03B 7/093 396/52 |
| 2017/0026580 | A1 * | 1/2017 | Gyotoku | H04N 5/23254 |
| 2017/0214838 | A1 * | 7/2017 | Miyazawa | H04N 5/2353 |
| 2017/0318224 | A1 * | 11/2017 | Kuchiki | G06T 5/20 |

FOREIGN PATENT DOCUMENTS

JP 2006-317848 A 11/2006

* cited by examiner

Primary Examiner — Hung H Lam
(74) Attorney, Agent, or Firm — Cowan, Liebowitz & Latman, P.C.

(57) ABSTRACT

An imaging apparatus is provided that includes a correction unit configured to optically correct image shake by moving a lens or an imaging element; a first detector configured to detect an angular velocity of the imaging apparatus; a second detector configured to detect a motion vector from a captured image; a calculator configured to calculate an object angular velocity on the basis of the angular velocity of imaging apparatus and the motion vector; a third detection unit configured to detect a cycle of a motion of the object on the basis of the object angular velocity; and a processor configured to detect a cycle of a motion of the object on the basis of the object angular velocity and set an exposure timing at the time of panning on the basis of the cycle of the motion of the object and correct image shake of the object by driving the correction unit.

11 Claims, 7 Drawing Sheets

IMAGING APPARATUS AND CONTROL METHOD

BACKGROUND OF THE INVENTION

Field of the Invention

The present invention relates to an imaging apparatus and a control method.

Description of the Related Art

As a photographing method using a camera, panning in which photographing is performed with a slower shutter speed than usual while following an object (moving body) when the object is photographed has been suggested. In panning, an image in which a background flows and the object is stationary is obtained. A photographer can take a photograph with a strong feeling of speed by performing panning. However, because it takes several seconds to perform panning, it is difficult to match a speed of the object and a speed at which a camera is moved during an exposure period and therefore panning is a photographing technique that requires skill.

Japanese Patent Laid-Open No. 2006-317848 discloses an imaging apparatus which corrects image shake of the object to be panned (shake of the object) by driving a shift lens according to an amount of difference between an object angular velocity and an output of an angular velocity sensor in a camera.

In the imaging apparatus disclosed in Japanese Patent Laid-Open No. 2006-317848, if the object has a component of motion different from a movement direction (for example, up and down movement or the like of a runner), it is difficult to suppress shake of the object generated by the motion.

SUMMARY OF THE INVENTION

An object of the present invention is to provide an imaging apparatus which can suppress shake of the object caused by a component of motion which is different from a movement direction of the object at the time of panning.

According to an aspect of the present invention, an imaging apparatus is provided that includes a correction unit configured to optically correct image shake by moving a lens or an imaging element; a first detector configured to detect an angular velocity of the imaging apparatus; a second detector configured to detect a motion vector from a captured image; a calculator configured to calculate an object angular velocity on the basis of the angular velocity of imaging apparatus and the motion vector; a third detection unit configured to detect a cycle of a motion of the object on the basis of the object angular velocity; and a processor configured to detect a cycle of a motion of the object on the basis of the object angular velocity and set an exposure timing at the time of panning on the basis of the cycle of the motion of the object and correct image shake of the object by driving the correction unit.

According to the imaging apparatus of the present invention, it is possible to suppress shake of an object caused by a component of motion different from a movement direction of the object at the time of panning.

Further features of the present invention will become apparent from the following description of exemplary embodiments (with reference to the attached drawings).

DESCRIPTION OF THE EMBODIMENTS

First Embodiment

Figure 1:
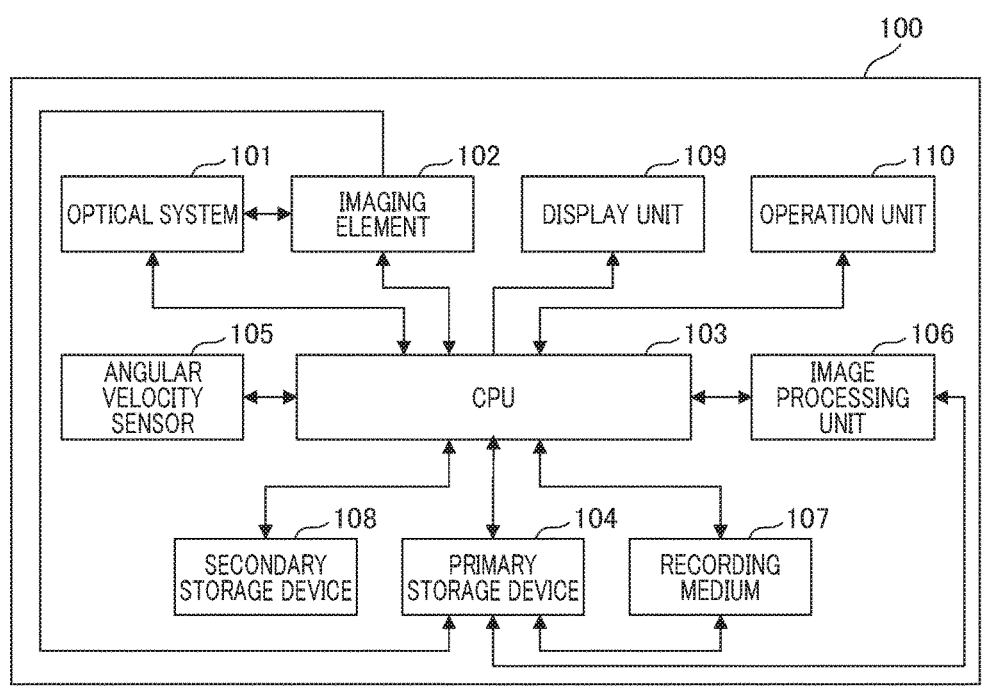
FIG. 1 is a block diagram illustrating a basic configuration of an imaging apparatus.

FIG. 1 is a block diagram which shows a basic configuration of an imaging apparatus of the present embodiment. An imaging apparatus 100 may be a camera such as a digital camera or a digital video camera, and may be any electronic apparatus having a camera function such as a mobile phone with a camera function or a computer with a camera.

An optical system 101 includes a lens, a shutter, and an aperture, and causes light from an object to be imaged on an imaging element 102 by control of a CPU 103. The lens included in the optical system 101 includes, for example, a focus lens, a zoom lens, a shift lens, and the like. The shift lens is a correction unit used to optically correct shake (image shake) occurring in a captured image due to shake applied to the imaging apparatus 100. CPU is an abbreviation for "central processing unit." The imaging element 102 such as a CCD image sensor or a CMOS image sensor converts light imaged through the optical system 101 into an image signal. CCD is an abbreviation for "charge coupled device." CMOS is an abbreviation for "complementary metal oxide semiconductor."

An angular velocity sensor 105 such as a gyro sensor detects an angular velocity indicating a movement amount of the imaging apparatus 100, converts the angular velocity into an electric signal, and transmits the signal to the CPU 103. The CPU 103 realizes a function of the imaging apparatus 100 by controlling each unit constituting the imaging apparatus 100 according to an input signal and a program stored in advance. A primary storage device 104 is, for example, a volatile device such as a RAM that temporarily stores data and is used for work of the CPU 103. RAM is an abbreviation for "random access memory." In addition, information stored in the primary storage device 104 is used by an image processing unit 106 or is recorded in a recording medium 107.

A secondary storage device 108 is a non-volatile storage device such as an EEPROM that stores a program (firmware) or various types of setting information to control the imaging apparatus 100 and is used by the CPU 103. EEPROM is an abbreviation for "electrically erasable programmable read only memory."

A recording medium 107 records data of images and the like which are stored in the primary storage device 104 and obtained by photographing. The recording medium 107 can be removed from the imaging apparatus 100, for example, like a semiconductor memory card, and the recorded data can be read by the imaging apparatus 100 mounted on a personal computer and the like. That is, the imaging apparatus 100 has attachment/detachment mechanisms of the recording medium 107 and reading/writing functions. The display unit 109 performs display of viewfinder images at the time of photographing, display of photographed images, display of GUI images for an interactive operation, and the like. GUI is an abbreviation for "graphic user interface." The operation unit 110 is an input device group which receives an operation of a user and transmits input information to the CPU 103, and may also be an input apparatus using, for example, a button, a lever, a touch panel, a sound, a visual line, or the like.

The imaging apparatus 100 has a plurality of image processing patterns applied to a captured image by the image processing unit 106, and can set a pattern from the operation unit 110 as an imaging mode. The image processing unit 106 performs not only image processing referred to as so-called developing processing but also adjustment of color tone and the like in accordance with a photographing mode. At least a part of the function of the image processing unit 106 may be realized by the CPU 103 through software.

Figure 2:
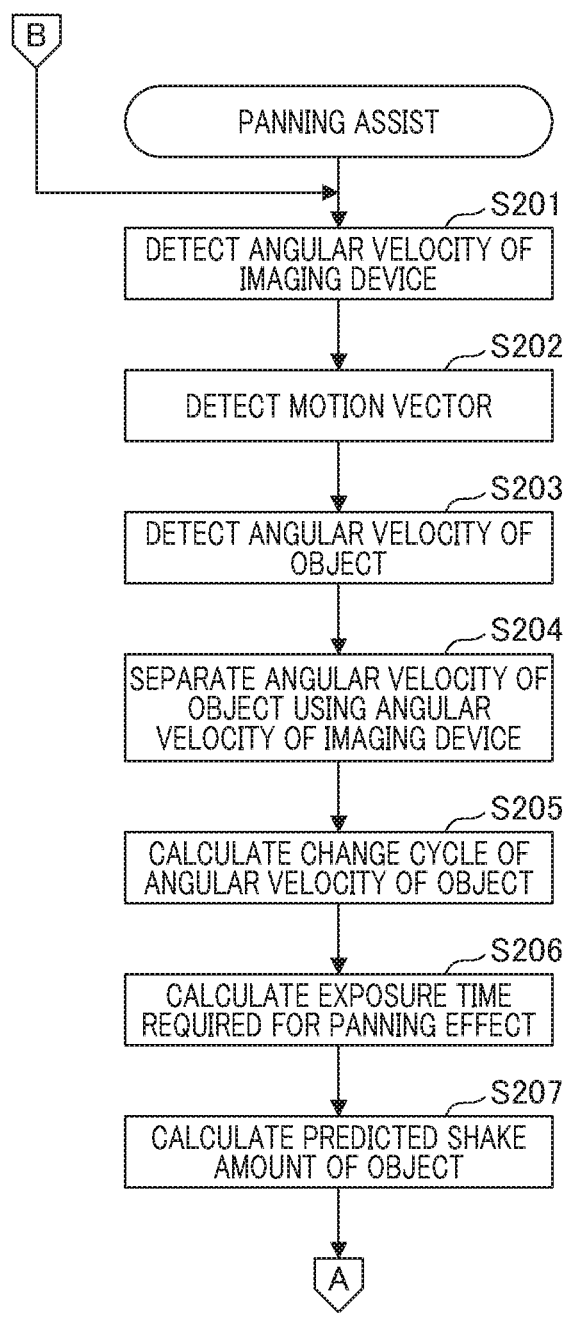
FIG. 2 is a flowchart illustrating motion processing in a panning assist mode.
Figure 3:
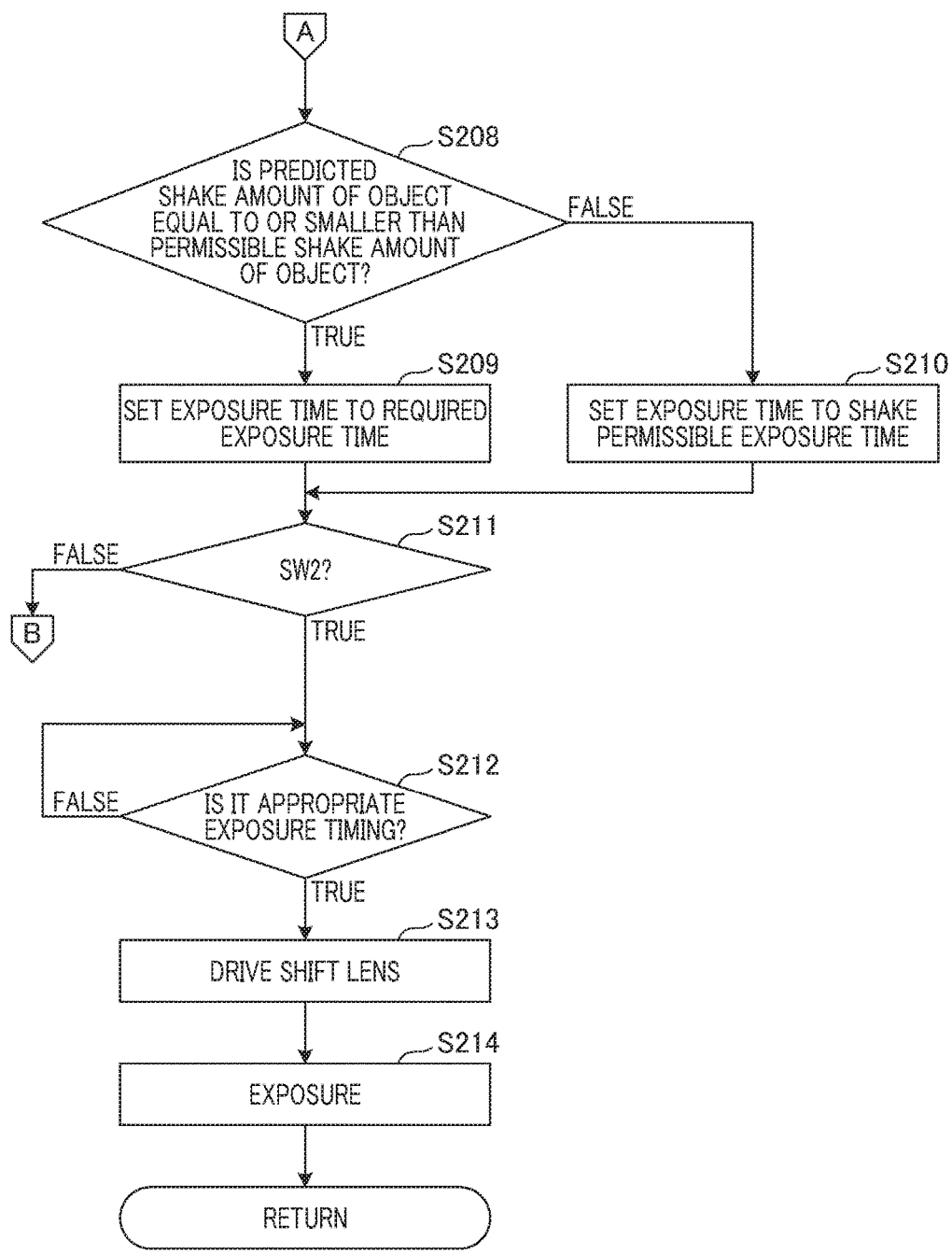
FIG. 3 is a flowchart illustrating the motion processing in the panning assist mode.

FIGS. 2 and 3 are flowcharts which describe motion processing in the panning assist mode. In S201 of FIG. 2, the CPU 103 functions as a first detection unit which detects an angular velocity of the imaging apparatus 100 detected by the angular velocity sensor 105. The angular velocity of the imaging apparatus 100 is assumed to be continuously detected at a constant cycle.

In S202, the CPU 103 functions as a second detection unit. The CPU 103 divides images sequentially acquired by the imaging element 102 into a plurality of block areas, and detects a motion vector between the images by controlling the image processing unit 106. Then, the CPU 103 converts the detected motion vector into a movement amount on an imaging surface.

In S203, the CPU 103 calculates an object angular velocity on the basis of the angular velocity of the imaging apparatus 100 detected in S201 and the motion vector converted into a movement amount on the imaging surface in S202.

The motion vector includes a motion vector of an object to be panned (hereinafter referred to as "object vector") and a vector of background other than the object (hereinafter referred to as "background vector"). The object angular velocity can be calculated by adding a deviation amount of the object vector to the angular velocity of the imaging apparatus 100. As a method of specifying the object vector, for example, there is a method of setting a vector close to a movement amount on an imaging surface which corresponds to the angular velocity of the imaging apparatus 100 as the background vector. In addition, there are a method of setting a motion vector having a small magnitude as the object vector, and a method of setting a motion vector of an area in which an object is recognized through, for example, face detection as the object vector, and the like. Of course, the object vector may be specified using other methods. If a focal length is set to (f [mm]), and an interval (hereinafter, frame rate) between obtained images is set to (fps [frames/sec]), the angular velocity (ω [rad/sec]) of the imaging apparatus 100 is converted into a movement amount (a [mm]) on the imaging surface between images in Formula 1.

$$a = f \tan\left(\frac{\omega}{\text{fps}}\right) \quad \text{Formula 1}$$

In S204, the CPU 103 separates the object angular velocity calculated in S203 into a component of a panning direction and a component of a direction orthogonal to the panning direction (hereinafter referred to as an orthogonal direction component) using the angular velocity of the imaging apparatus 100 detected in S201.

In S205, the CPU 103 calculates a change cycle of the orthogonal direction component of the object angular velocity separated in S204, and detects a timing at which shake of the object can be suppressed. A method of calculating the change cycle includes, for example, a method of calculating the change cycle from an acquisition cycle of the angular velocity detected in S201 and a method of calculating the change cycle from an acquisition cycle of images consecutively acquired to detect a motion vector in S202. Of course, the CPU 103 may calculate the change cycle using other methods.

Figure 6A:
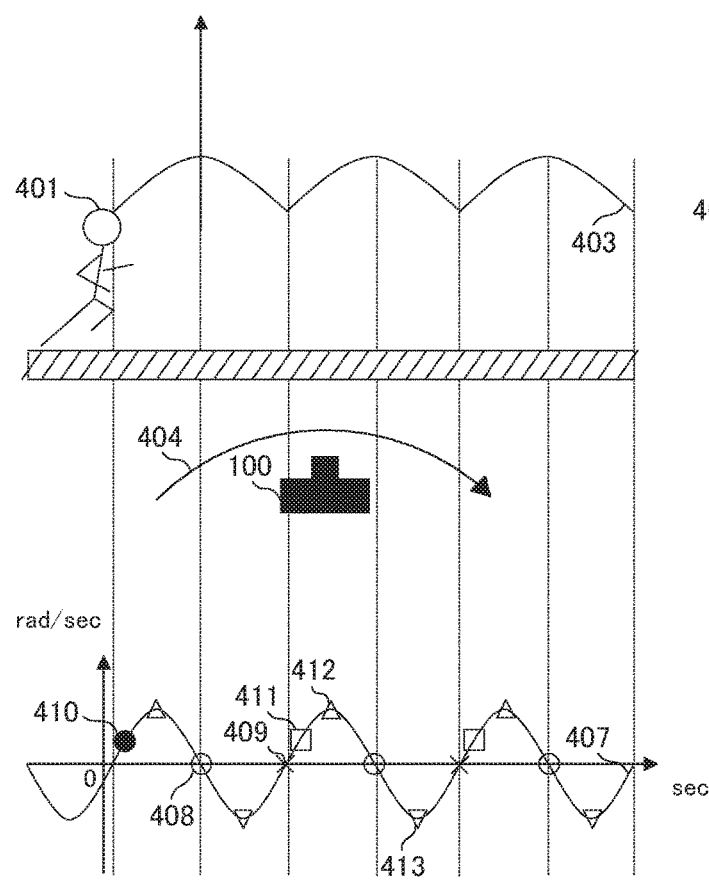
FIGS. 6A and 6B are diagrams illustrating examples of changes in an object angular velocity.
Figure 6B:
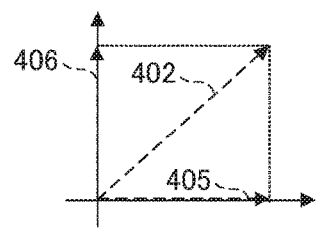

FIGS. 6A and 6B are diagrams which show examples of changes in the object angular velocity. S204 and S205 of FIG. 2 will be described with reference to FIGS. 6A and 6B. FIG. 6A shows an example of the case of photographing a runner. In FIG. 6A, a scene in which a runner (object) 401 runs while the angular velocity 402 of the object (FIG. 6B) changes as shown by a trajectory 403 is photographed through panning as shown by a trajectory 404 by the imaging apparatus 100.

In S204 of FIG. 2, the CPU 103 separates the angular velocity 402 of the object into a panning direction component 405 and an orthogonal direction component 406 as shown in FIG. 6B. A change in the orthogonal direction component 406 corresponding to the trajectory 403 of a change in the object angular velocity is represented by a trajectory 407. In this example, a vertical axis is an angular velocity (rad/sec), and a horizontal axis is time (sec).

In S205 of FIG. 2, the CPU 103 functions as a third detection unit. The CPU 103 calculates a cycle of a motion of the object (change cycle) as shown in the trajectory 407 of a change in the orthogonal direction component 406 on the basis of the separated object angular velocity. Then, the CPU 103 detects, like a timing 408 or 409, a timing at which shake of the object can be suppressed, that is, a timing at which a direction of the motion of the object is reversed, as a timing set as an exposure center. Through the above processing, it is possible to specify an exposure timing at which shake of the object can be suppressed.

In S206 of FIG. 2, the CPU 103 executes following processing on the basis of the panning direction component 405 (y [rad/sec]) of the object angular velocity separated in S204 and a focal length (f [mm]). The CPU 103 calculates exposure time (t [sec]) required to satisfy a desired panning effect (a flow amount of a background) (l [mm]) using Formula 2.

$$t = \frac{\tan^{-1}\left(\frac{l}{f}\right)}{y} \quad \text{Formula 2}$$

In S207, the CPU 103 calculates a predicted shake amount of the object on the basis of the exposure time (a first exposure time) calculated in S206 and the change cycle of the orthogonal direction component 406 of the object angular velocity calculated in S205. The predicted shake amount of the object is a predicted amount of image shake related to the object (shake of the object) Subsequently, in S208 of FIG. 3, the CPU 103 compares the predicted shake amount of the object calculated in S207 with a permissible shake amount of the object set in advance. The permissible shake amount of the object is the permissible amount of shake of the object. The CPU 103 determines whether the predicted shake amount of the object is equal to or smaller than the per shake amount of the object. If the predicted shake amount of the object is larger than the permissible shake amount of the object, the processing proceeds to S210.

If the predicted shake amount of the object is equal to or smaller than the permissible shake amount of the object (equal to or smaller than the permissible amount), the processing proceeds to S209. Then, in S209, the CPU 103 sets the exposure time to the exposure time required to satisfy the panning effect calculated in S206.

In S210, the CPU 103 sets a shake permissible exposure time as the exposure time at the time of panning. The shake permissible exposure time is an exposure time in which shake of the object falls within the permissible amount (within the permissible shake amount of the object). The CPU 103 calculates the shake permissible exposure time by integrating time in consideration of a change in the object angular velocity using the change cycle of the orthogonal direction component 406 of the object angular velocity calculated in S205.

Figure 7A:
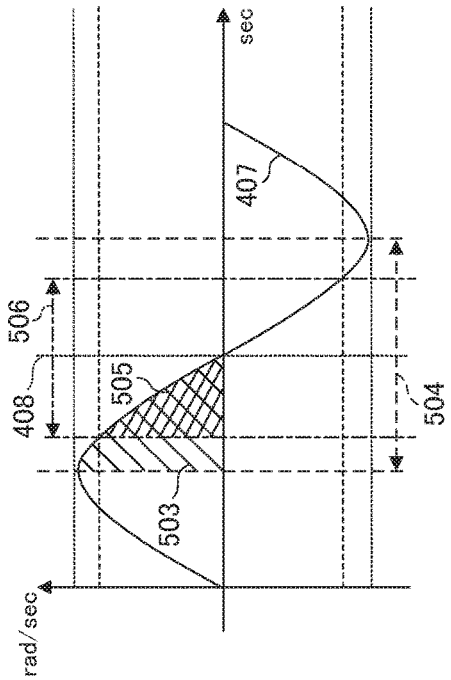
FIGS. 7A to 7D are diagrams illustrating a calculation method of exposure time.
Figure 7B:
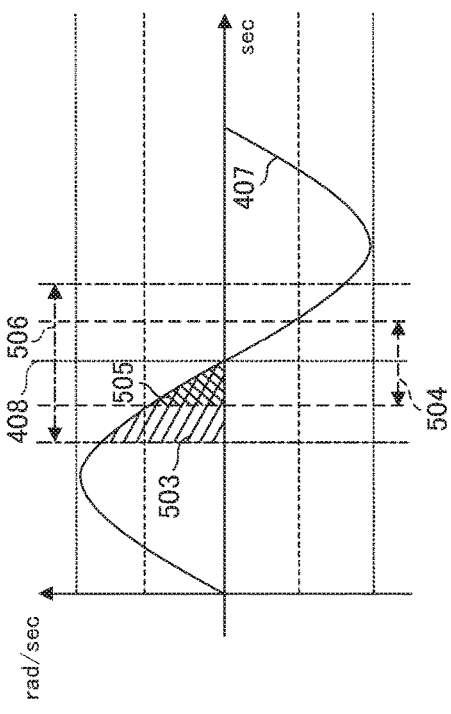
Figure 7C:
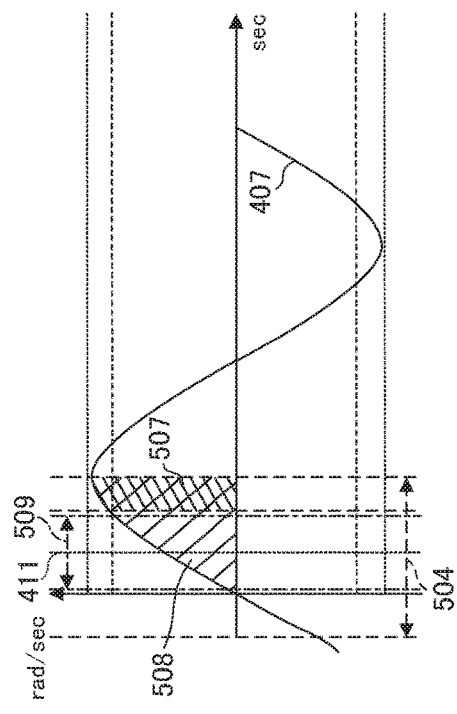
Figure 7D:
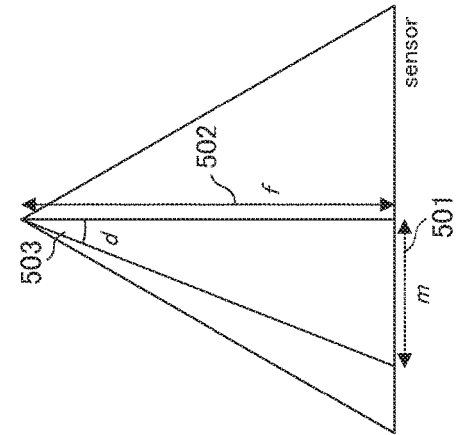

FIGS. 7A to 7D are diagrams which describe a method of calculating exposure time. FIG. 7D shows a shake amount on the imaging surface. If the permissible shake amount of the object on the imaging surface is set to shake amount 501 (m [mm]), and a focal length is set to a distance 502 (f [mm]), the permissible shake amount (angle) 503 (dmax [rad]) of the object can be calculated using Formula 3.

$$d_{max} = \tan^{-1}\left(\frac{m}{f}\right) \quad \text{Formula 3}$$

FIG. 7A shows the exposure time set in S209. A predicted shake amount (angle) 505 (d [rad]) of the object appearing in an actual image can be calculated as follows using the exposure time 504 (t [sec]) required to satisfy the panning effect, which is calculated in S206 of FIG. 2. The CPU 103 calculates the predicted shake amount (angle) 505 (d [rad]) of the object using Formula 4 based on the panning direction component 407 (p [rad/sec]) of the object angular velocity separated in S204.

$$d = \int_t p \quad \text{Formula 4}$$

If the CPU 103 performs exposure with the timing 408 or the timing 409 calculated in S205 as a center, a shake direction of the object is symmetrical with the exposure center. Therefore, a shake amount of the object for half the exposure time 504 ([sec]) calculated in S206 is a shake amount which appears in an actual image. That is, since a longer exposure time can be allowed, it is possible to realize a larger panning effect or to photograph the object that moves relatively slowly.

In the example shown in FIG. 7A, the predicted shake amount (angle) 505 ([rad]) of the object is smaller than the permissible shake amount (angle) 503 ([rad]) of the object. Therefore, the CPU 103 sets the exposure time 504 ([sec]) required to satisfy the panning effect calculated in S206 as the exposure time.

FIG. 7B is a diagram which describes the exposure time set in S210. In the example shown in FIG. 7B, the predicted shake amount (angle) 505 ([rad]) of the object is larger than the permissible shake amount (angle) 503 ([rad]) of the object. Therefore, the CPU 103 sets the exposure time 506 which falls within the permissible shake amount of the object calculated in S210 as the exposure time. In this example, the CPU 103 performs determination using the permissible amount and a predicted amount of the shake amount of the object, but it may also calculate a longest exposure time which falls within the permissible amount of the shake amount of the object to determine whether the required exposure time falls within the longest exposure time. Through the processing described above, it is possible to suppress shake of the object which is caused by setting the exposure time satisfying the panning effect (the flow amount of a background) and exceeds the permissible amount.

In S211 of FIG. 3, the CPU 103 determines to start exposure. In this example, the CPU 103 determines whether a full press (hereinafter, SW2) of the shutter button (operation unit 110) is performed. If SW2 is not performed, the processing returns to S201 of FIG. 2. If SW2 is performed, the processing proceeds to S212.

In S212, the CPU 103 determines whether shake of the object is at the timing 408 or 409 at which the shake of the object can be suppressed using the change cycle of the orthogonal direction component 406 of the object angular velocity calculated in S205. If the shake of the object is not at the timing 408 or 409, the processing returns to S212.

If the shake of the object is at the timing 408 or 409 at which the shake of the object can be suppressed, the processing proceeds to S213. In S213, the CPU 103 starts driving of a shift lens to suppress shake of the object using the optical system 101. That is, the CPU 103 functions as a control unit which sets an exposure timing at the time of panning on the basis of a cycle or the motion of the object and corrects shake of the object by driving the shift lens. Then, the CPU 103 starts exposure in S214. The shift lens is driven throughout the exposure.

As a method of driving the shift lens, for example, the CPU 103 drives the shift lens in a panning direction using a difference between a panning direction component of the object angular velocity separated in S204 and the angular velocity of the imaging apparatus 100 detected in S201. Then, the CPU 103 drives the shift lens in an orthogonal direction in the same manner as in normal camera shake correction control. Accordingly, the shake of the object caused by the component of motion different from the movement direction of the object can be within the permissible shake amount of the object.

Through the processing described above, the shake of the object caused by the component of motion different from the movement direction of the object can also be suppressed in the panning assist mode. In the present embodiment, an example of correcting a binding position of the object by the shift lens (optical system 101) is shown; however, the present invention is not limited thereto, and the shake of the object can be suppressed by, for example, causing the imaging element 102 to shift itself, and the like.

Second Embodiment

Next, an imaging apparatus of Embodiment 2 will be described. A basic configuration of the imaging apparatus of Embodiment 2 is the same as the basic configuration of the imaging apparatus of Embodiment 1 shown in FIG. 1.

Figure 4:
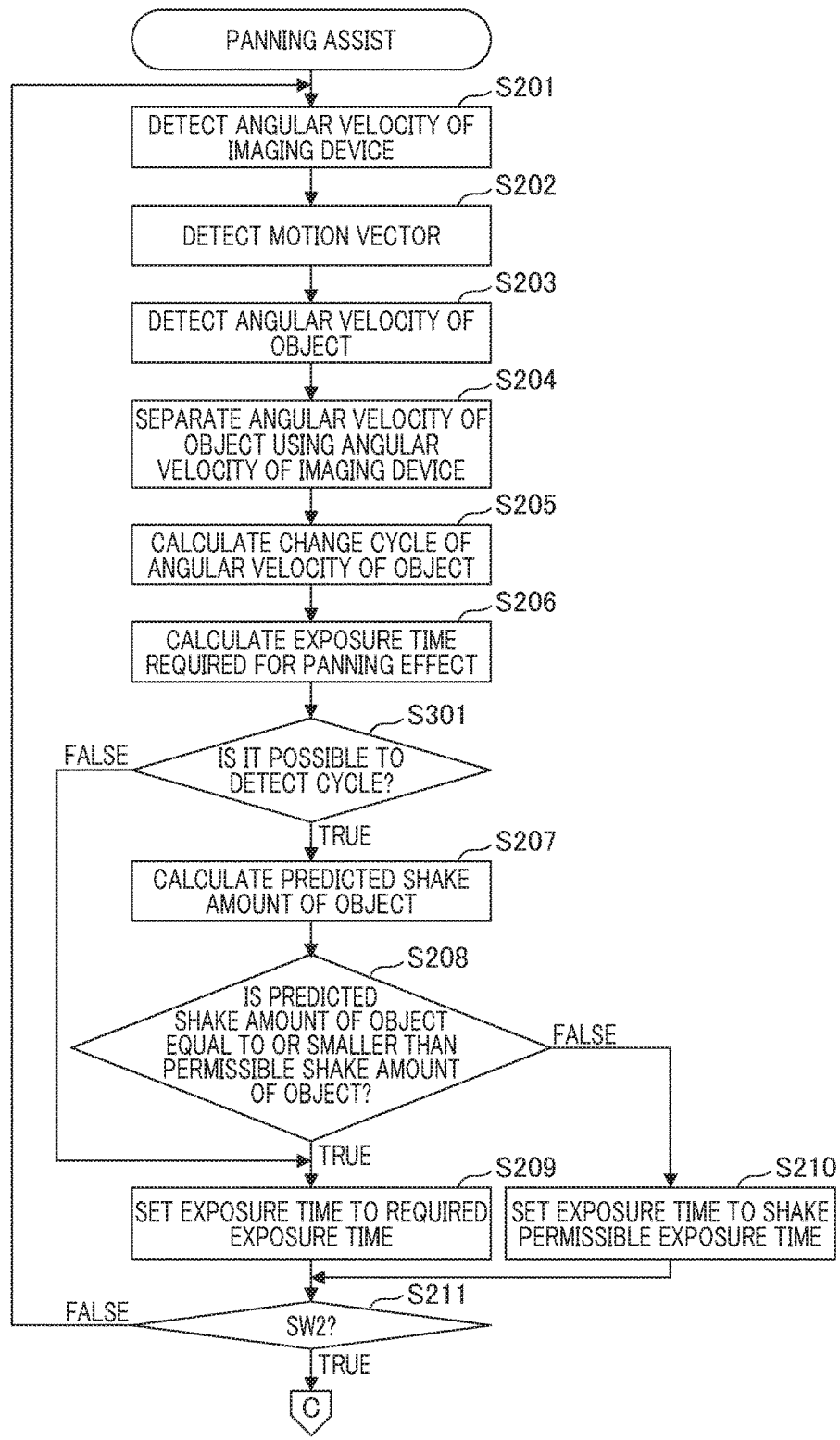
FIG. 4 is a flowchart illustrating the motion processing in the panning assist mode.
Figure 5:
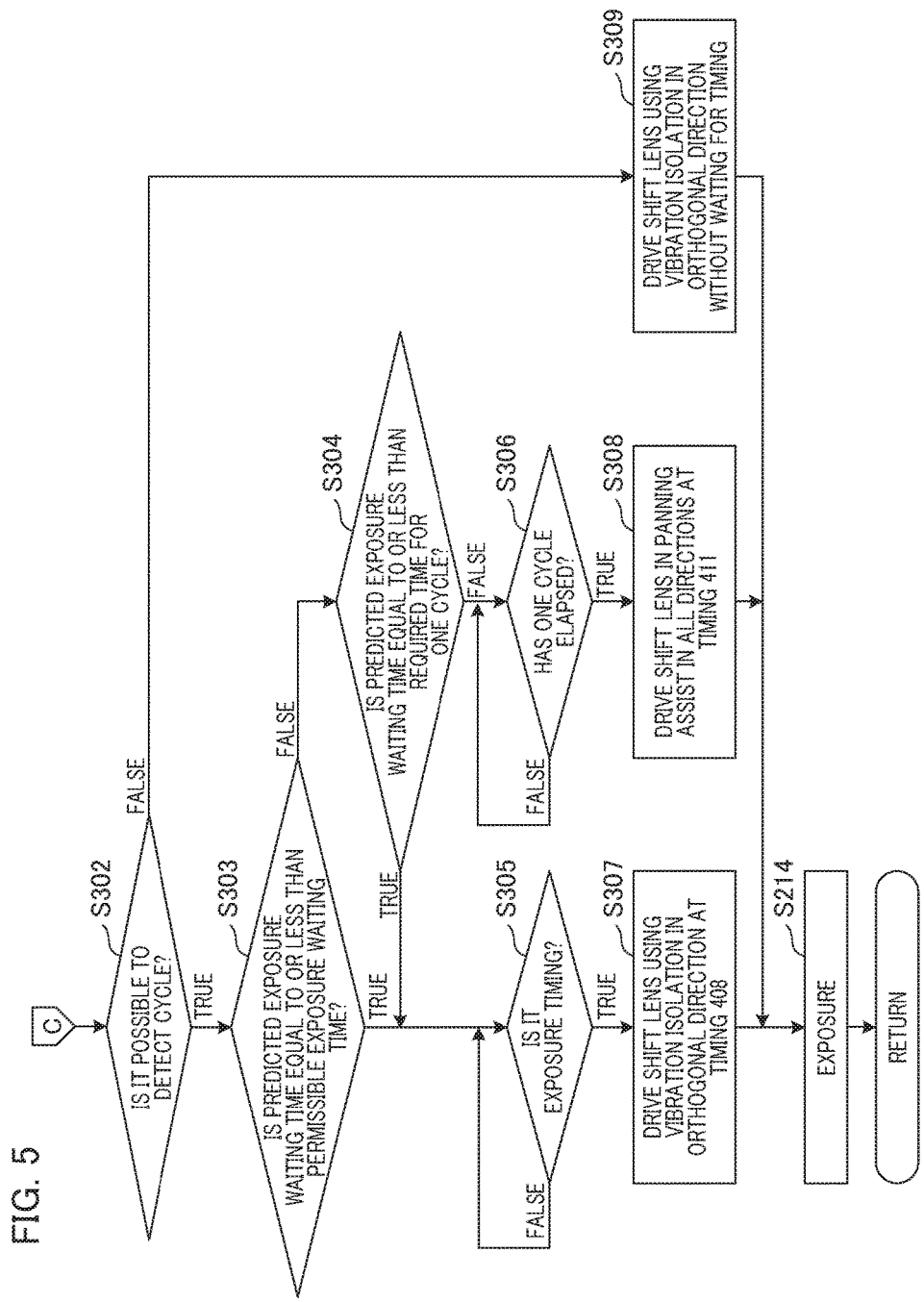
FIG. 5 is a flowchart illustrating the motion processing in the panning assist mode.

FIGS. 1 and 5 are flowcharts which describe motion processing of the imaging apparatus of Embodiment 2 in a panning assist mode. Processing of S201 to S206 of FIG. 4 is the same as processing of S201 to S206 of FIG. 2, and thus description thereof will be omitted.

In S301, the CPU 103 determines whether the change cycle 407 of the orthogonal direction component 406 of the object angular velocity can be calculated in S205. If the change cycle 407 can be calculated, the processing proceeds to S207. If the change cycle cannot be calculated, the processing proceeds to S209. Then, in S209, the CPU 103 sets exposure time to the exposure time required to satisfy the panning effect calculated in S206.

Since processing from S207 of FIG. 4 to S211 of FIG. 5 is the same as the processing from S207 of FIG. 2 to S211 of FIG. 3, the description thereof will be omitted. In S302 of FIG. 5, the CPU 103 determines whether the change cycle 407 of the orthogonal direction component 406 of the object angular velocity can be calculated in S205 again. If the change cycle 407 can be calculated, the processing proceeds to S303. If the change cycle cannot be calculated, the processing proceeds to In S303, the CPU 103 calculates a timing at which shake of the object can be suppressed using the change cycle 407 of the orthogonal direction component 406 of the object angular velocity calculated in S205. Specifically, the CPU 103 calculates the timing 408 or 409 at which shake of the object can be suppressed. The CPU 103 calculates an exposure waiting time up to the timing 408 or 409 as a predicted exposure waiting time. Then, the CPU 103 determines whether the predicted exposure waiting time is within an permissible exposure waiting time set in advance.

If the predicted exposure waiting time is within the permissible exposure waiting time, that is, if there is no problem caused by delaying an exposure start timing, the processing proceeds to S305. In S305, the CPU 103 determines whether it is the exposure timing, that is, whether it is the timing 408 or 409 calculated in S205. If it is not the timing 408 or 409, the processing returns to S305. If it is the timing 408 or 409, the processing proceeds to S307.

When the CPU 103 performs the exposure (S214) at the timing 408 or 409, the component of the motion different from the movement direction can normally be ignored. Therefore, the CPU 103 performs following processing using the optical system 101 in S307. The CPU 103 corrects shake of the object by driving a shift lens only in the movement direction (the panning direction) using a difference between the panning direction component of the object angular velocity separated in S204 and the angular velocity of the imaging apparatus 100 detected in S201. The CPU 103 performs normal camera shake correction control by driving the shift lens in the orthogonal direction.

If the predicted exposure waiting time is determined to be larger than the permissible exposure waiting time in the determination processing in S303, that is, if shake of the object is more likely to occur if the exposure start timing is delayed, the processing proceeds to S304. In S304, the CPU 103 determines whether the predicted exposure waiting time is within a required time for one cycle of the orthogonal direction component 406 of the object angular velocity calculated in S205, that is, a waiting time until a timing 411 which is the same as a time 410 at the object angular velocity s detected. If the predicted exposure waiting time is within the required time for one cycle, the shake of the object is more likely to be suppressed in the processing of S305. Therefore, in this case, the processing proceeds to S305.

If the predicted exposure waiting time is not within the required time for one cycle, it is considered that the shake of the object can be suppressed by starting exposure at a closer timing to the time 410 at which the object angular velocity is detected. Therefore, the processing proceeds to S306. Subsequently, the CPU 103 determines whether one cycle of the orthogonal direction component 406 of the object angular velocity has elapsed. If one cycle of the orthogonal direction component 406 of the object angular velocity has not elapsed, the processing returns to S306. If one cycle of the orthogonal direction component 406 of the object angular velocity has elapsed, the processing proceeds to S308. In S308, the CPU 103 drives the shift lens for correcting the shake of the object in both of the panning direction and the direction orthogonal to the panning direction at the timing 411.

FIG. 7C is a diagram which describes exposure time at a timing 411 in the processing of S308. If photographing is performed at the timing 411 after an elapse of one cycle, a shake direction of the object is not symmetrical with respect to the exposure center in some cases. Specifically, there are cases in which a difference, for example, in a shake amount 507 of the object occurs. Therefore, the CPU 103 calculates, in the same manner as S207 to S210, a predicted shake amount (angle) 508 ([rad]) of the object appearing in an actual image again to reset the exposure time.

In S308 of FIG. 5, since exposure (S214) is performed the same timing at which the object angular velocity is detected, data at the time of the detection can be used as it is. Therefore, the CPU 103 drives the shift lens using a difference between the object angular velocity calculated in S203 and the angular velocity of the imaging apparatus 100 detected in S201.

The CPU 103 may also store the object angular velocity in a predetermined storage unit at each switching point (408, 409, 411, 412, and 413) of the change cycle 407 of the orthogonal direction component 406 of the object angular velocity calculated in S205. Then, the CPU 103 may also perform exposure (S214) at each switching point using the stored object angular velocity.

Since control of the shift lens from the timing 408 to 411 is the same as described above, description thereof will be omitted herein. The timings 412 and 413 are timings at which the object angular velocity becomes a maximum although they differ in polarity. Therefore, the shift lens before and after of the timings 412 and 413 is considered to move in the same direction, and thus the shift lens may be driven using a difference between the object angular velocity calculated in S203 and the angular velocity of the imaging apparatus 100 detected in S201. Through the processing described above, exposure can be started at a closer timing to the time 410 at which the object angular velocity is detected, and thus it is possible to more effectively suppress the image shake of a object.

In addition, in S309, the CPU 103 performs following processing. Since the change cycle of the orthogonal direction component 406 of the object angular velocity cannot be calculated, it is better to start the exposure (S214) at the soonest possible timing. In addition, a case in which an irregular motion is performed is also considered when the change cycle cannot be calculated, and thus it is better not to perform extra correction. As a result, the CPU 103 performs following processing using the optical system 101. The CPU 103 drives the shift lens in the movement direction, that is, in the panning direction only, using a difference between the panning direction component of the object angular velocity separated in S204 and the angular velocity of the imaging apparatus 100 detected in S201. The CPU 103 drives the shift lens in the orthogonal direction in the same manner as in the normal camera shake correction control. Then, the CPU 103 starts the exposure in S214.

Through the processing described above, it is possible to more effectively suppress shake of the object caused by a component of motion different from the movement direction of the object in the panning assist mode. An example of image shake correction using a drive of the shift lens (optical system 101) is shown in the present embodiment; however, the present invention is not limited thereto, and the image shake correction can also be realized by, for example, causing the imaging element 102 itself to shift.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-221337, filed Nov. 14, 2016 which is hereby incorporated by reference wherein in its entirety.

What is claimed is:

1. An imaging apparatus comprising:
    a correction unit configured to optically correct image shake by moving a lens or an imaging element;
    a first detector configured to detect an angular velocity of the imaging apparatus;
    a second detector configured to detect a motion vector from a captured image;
    a calculator configured to calculate an object angular velocity on the basis of the angular velocity of imaging apparatus and the motion vector;
    a third detection unit configured to detect a cycle of a motion of the object on the basis of the object angular velocity; and
    a processor configured to detect a cycle of a motion of the object on the basis of the object angular velocity and set an exposure timing at the time of panning on the basis of the cycle of the motion of the object and correct image shake of the object by driving the correction unit.

2. The imaging apparatus according to claim 1, wherein the processor corrects the image shake of the object by driving the correction unit on the basis of the object angular velocity and the angular velocity of the imaging apparatus.

3. The imaging apparatus according to claim 1, wherein the processor separates the object angular velocity into a component of a panning direction of the imaging apparatus and a component of a direction orthogonal to the panning direction and detects a cycle of the component of a direction orthogonal to the panning direction as a cycle of the motion of the object.

4. The imaging apparatus according to claim 3, wherein the processor calculates a first exposure time which is a flow amount of a predetermined background on the basis of the component of the panning direction of the object angular velocity and a focal length.

5. The imaging apparatus according to claim 4, wherein the processor calculates a predicted shake amount of the object which is a predicted amount of shake of the object on the basis of the cycle of the component of the direction orthogonal to the panning direction of the object angular velocity and the first exposure time.

6. The imaging apparatus according to claim 5, wherein the processor sets the first exposure time as an exposure time at the time of panning if the predicted shake amount of the object is equal to or less than an permissible amount of shake of the object.

7. The imaging apparatus according to claim 5, wherein the processor sets an exposure time in which the shake of the object falls within the permissible amount as the exposure time at the time of panning if the predicted shake amount of the object is not equal to or less than the permissible amount of image shake of the object.

8. The imaging apparatus according to claim 1, wherein the processor corrects the image shake of the object in a panning direction and performs camera shake correction control in a direction orthogonal to the panning direction if exposure is performed with a timing at which a direction of the motion of the object is reversed as an exposure center.

9. The imaging apparatus according to claim 1, wherein the processor corrects the image shake of the object in a panning direction and a direction orthogonal to the panning direction if exposure is performed at the same timing at which the object angular velocity is detected as an exposure center.

10. The imaging apparatus according to claim 1, wherein the processor performs camera shake correction control if the cycle of the motion of the object is not detected.

11. A method of controlling an imaging apparatus which includes a correction unit used to optically correct image shake by moving a lens or an imaging element, the method comprising:
    detecting an angular velocity of the imaging apparatus;
    detecting a motion vector from a captured image;
    calculating an object angular velocity on the basis of the angular velocity of the imaging apparatus and the motion vector;
    detecting a cycle of a motion of an object on the basis of the object angular velocity;
    detecting a cycle of a motion of the object on the basis of the object angular velocity; and
    setting an exposure timing at the time of panning on the basis of the cycle of the motion of the object and correcting image shake of the object by driving the correction unit.

* * * * *